(12) United States Patent
Strumolo et al.

(10) Patent No.: US 6,975,347 B1
(45) Date of Patent: Dec. 13, 2005

(54) METHOD AND APPARATUS FOR ACQUIRING AND DISPLAYING IMAGES

(75) Inventors: Gary Steven Strumolo, Beverly Hills, MI (US); Ronald Hugh Miller, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 529 days.

(21) Appl. No.: 09/620,044

(22) Filed: Jul. 20, 2000

(51) Int. Cl.[7] .............................................. H04N 7/18
(52) U.S. Cl. ........................... 348/148; 348/115; 345/7
(58) Field of Search .................... 345/7, 8, 9; 359/629, 359/630, 632; 340/461, 468; 348/115, 118, 348/148; 701/36

(56) References Cited

U.S. PATENT DOCUMENTS

| | | | | |
|---|---|---|---|---|
| 4,846,686 A | * | 7/1989 | Adams ........................ 434/69 |
| 4,908,611 A | * | 3/1990 | Iino ............................... 345/7 |
| 5,027,200 A | * | 6/1991 | Petrossian et al. .......... 348/118 |
| 5,745,173 A | | 4/1998 | Edwards et al. |
| 6,161,066 A | * | 12/2000 | Wright et al. ................. 701/36 |
| 6,215,518 B1 | * | 4/2001 | Watkins ....................... 348/148 |
| 6,232,932 B1 | * | 5/2001 | Thorner ....................... 345/1.3 |
| 6,304,173 B2 | * | 10/2001 | Pala et al. ................... 340/461 |
| 6,411,874 B2 | * | 6/2002 | Morgan et al. ............... 701/36 |
| 6,498,620 B2 | * | 12/2002 | Schofield et al. ........... 348/148 |

FOREIGN PATENT DOCUMENTS

| | | |
|---|---|---|
| EP | 0643315 A1 | 3/1995 |
| GB | 2327823 A | 2/1999 |
| JP | 03182848 | 3/1991 |
| JP | 03266740 | 3/1991 |

* cited by examiner

*Primary Examiner*—Kent Chang
(74) *Attorney, Agent, or Firm*—David B. Kelley; Gifford, Krass et al.

(57) ABSTRACT

An image acquisition and display assembly 12 for use upon a vehicle 10 and which includes a pair of substantially identical cameras 14, 16 which are adapted to receive images of objects 50, 52 or portions of the vehicular ambient environment 27 located in the front of and/or along the sides 24, 26 of the vehicle 10 and of objects 28, 30 or portions of the vehicular ambient environment 27 located in the rear and/or along the sides of the vehicle 10. The assembly 12 may include a pair of movable mirror assemblies 34, 36 which selectively and respectively communicate with cameras 14, 16, thereby allowing the cameras 14, 16 to receive the desired and previously delineated images.

14 Claims, 2 Drawing Sheets

METHOD AND APPARATUS FOR ACQUIRING AND DISPLAYING IMAGES

FIELD OF THE INVENTION

This invention generally relates to a method and an apparatus for acquiring and displaying images and more particularly, to a method and an apparatus for use within a vehicle and which selectively allows for the acquisition and display of images of objects and/or of a portion of the ambient vehicular environment located and/or disposed proximate to a vehicle.

BACKGROUND OF THE INVENTION

Traditionally, mirrors were used within and/or upon a vehicle to provide images of objects and/or of a portion of the ambient vehicular environment located behind the driver and the passengers of the vehicle (i.e., disposed toward the "rear" of the vehicle). While these mirrors allowed the vehicle occupants to view certain objects and/or portions of the environment in which the vehicle resided, these mirrors did not substantially allow for the acquisition and the display of images of objects and/or of the ambient vehicular environment located and/or disposed along the front of the vehicle or toward and/or along the frontal side portions of the vehicle.

Attempts have been made to provide images of areas and/or objects located towards the front of the vehicle and areas and/or objects located toward the rear of the vehicle by the use of four cameras. Particularly, in this configuration, a first pair of cameras were mounted on a first side of the vehicle and were "pointed" or positioned to respectively provide frontal and rearward images along this first vehicular side. A second pair of cameras were mounted upon a second side of the vehicle and were "pointed" or positioned to respectively provide frontal and rearward images along this second vehicular side.

While these cameras adequately acquired and provided the desired images, they were and remain relatively expensive. Moreover, the use of four such cameras in the foregoing manner undesirably complicated the overall vehicular image acquisition and display process, thereby increasing the likelihood of failure and/or undesired malfunction.

There is therefore a need for a new and improved vehicular image acquisition and display system which overcomes at least some of the previously delineated drawbacks of prior systems.

SUMMARY OF THE INVENTION

It is a first object of the present invention to provide a vehicular image acquisition and display system which overcomes at least some of the previously delineated drawbacks of prior vehicular image acquisition systems.

It is a second object of the present invention to provide a vehicular image acquisition and display system which overcomes at least some of the previously delineated drawbacks of prior systems and which selectively provides images of areas located in the front and the rear of a vehicle.

According to a first aspect of the present invention, an image acquisition assembly is provided. The image acquisition assembly comprises at least a first camera which is mounted upon a vehicle; and a mirror which is movable from a first position to a second position in which the mirror communicates with the lens.

According to a second aspect of the present invention a method for acquiring and displaying images is provided. The method comprises the steps of placing at least one camera upon a vehicle; placing at least one mirror upon said vehicle; causing the at least one mirror to be selectively extendable; and causing the at least one mirror to communicate with the at least one camera only when said at least one mirror is selectively extended.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
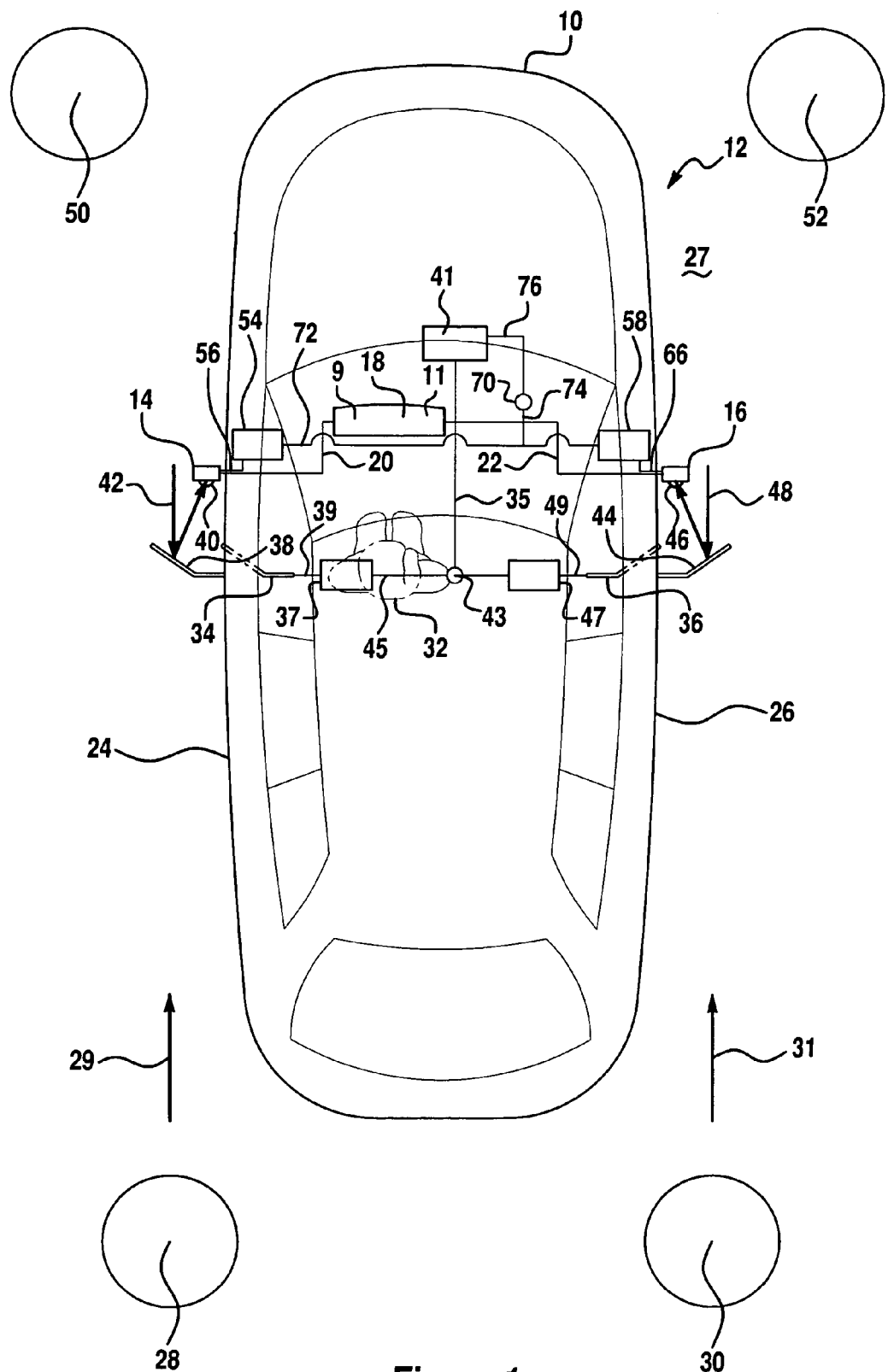
FIG. 1 is a top view of a vehicle having an image acquisition and display assembly which is made in accordance with the teachings of the preferred embodiment of the invention.
Figure 2:
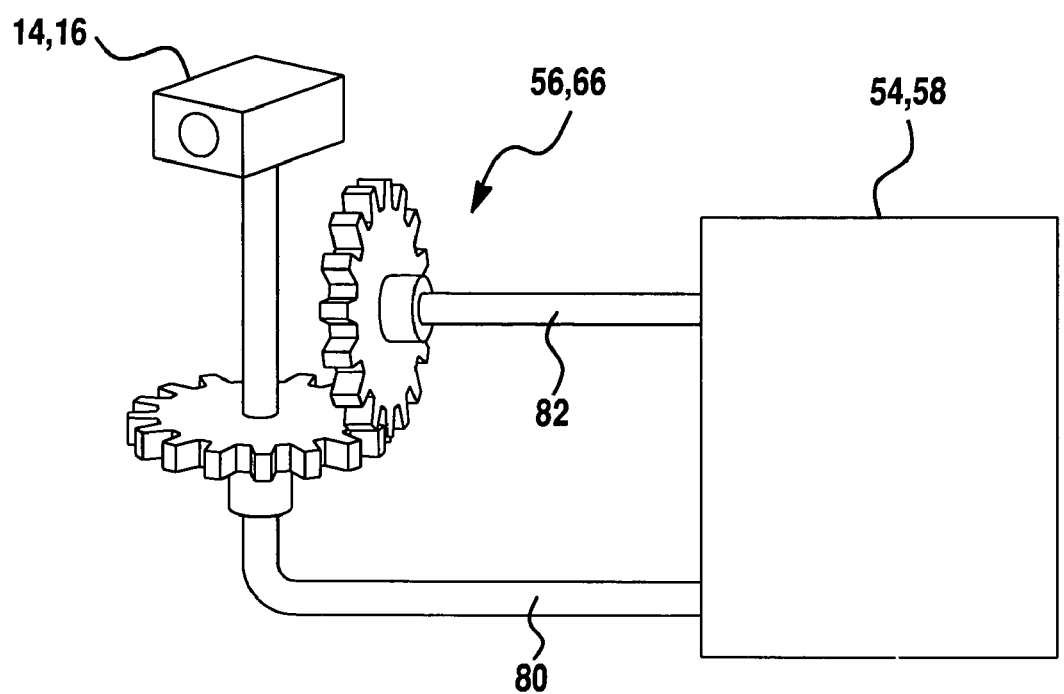
FIG. 2 is a perspective exploded view of one of the cameras which are shown in FIG. 1.

Referring now to FIG. 1, there is shown a vehicle 10 having an image acquisition and display apparatus or assembly 12 which is made in accordance with the teachings of the preferred embodiment of the invention.

As shown, assembly 12 includes a pair of substantially identical cameras 14, 16 which are each physically, communicatively, and electrically coupled to a display assembly 18 by use of respective busses 20, 22. Cameras 14, 16 may each comprise a "night vision" type camera or a charge coupled type camera and each camera 14, 16 may be of substantially any desired shape and size. As further shown, cameras 14, 16 are mounted upon opposite side portions 24, 26 of vehicle 10 and are each adapted to respectively acquire images of the portions of the ambient vehicular environment 27 and/or of objects, such as objects 28, 30, which are positioned toward the rear (i.e. behind the driver 32) of the vehicle 10 and which are respectively positioned along the vehicular sides 24 and 26. Particularly, such object images are "acquired" by the reception of lightrays 29, 31, which respectively "reflect off" of objects 28, 30, by respective lenses 40, 46 of cameras 14, 16. Cameras 14, 16 may reside within a respective and conventional protective vehicular side mirror shroud in one alternate and non-limiting embodiment of the invention.

Assembly 12 further includes retractable mirror assemblies 34, 36 which are respectively and physically coupled to the output shafts 39, 49 of respective motor assemblies 37 47. Motor assemblies 37, 47 are further physically, electrically, and communicatively coupled to the vehicular battery 41 and the switch 43 by use of busses 35, 45.

Particularly, upon moving switch 43 to a first position, motor assembly 37 causes mirror assembly 34 to be selectively movable from a first position (shown in phantom in FIG. 1) to a second extended position in which the reflective portion 38 is in communication with lens 40 of camera 14, thereby allowing lightrays 42 which "reflect off of" objects 50 located in the front of the vehicle 10 and/or along the side 24 of the vehicle 10 to be received by the camera 14 and/or which allows images of the region or the portion of the vehicular ambient environment 27 located in the front of the vehicle 10 and/or along the side 24 of the vehicle 10 to be received by the camera 14.

Similarly, upon moving switch 43 to a second position, motor assembly 47, which is then coupled to the vehicular battery 41, causes mirror assembly 36 to be selectively movable from a first position (shown in phantom in FIG. 1) to a second extended position in which the reflective portion 44 of mirror assembly 36 is in communication with lens 46 of camera 16, thereby allowing lightrays 48 which "reflect off of" objects 50, 52, located in the front of the vehicle 10 and/or along the side 26 to be received by the camera 16, and/or which allows images of portions of the vehicular ambient environment 27 located in the front of the vehicle 10 and/or along the side 26 of the vehicle 10 to be received by the camera 16. All such images which are received or acquired by the cameras 14, 16 are selectively displayed upon the screen or display 18. Selectively positioning switch 43 to a third position causes the mirror assemblies 34, 36 to be retracted. In one non-limiting embodiment of the invention, display 18 comprises a "heads up" type display. Further, it should be appreciated that display 18 is adapted, in one-embodiment of the invention, to "flip" or to switchably display the images received from the cameras 14, 16 (i.e., images received from the camera 14 are displayed upon the right portion 11 of the display 18 and images received from the camera 16 are displayed upon the left portion 9 of the display 18 (i.e., the portion 9 of the display 18 proximate or closest to camera 14). In this manner, images received from the camera 14 which is positioned to the left of the driver 32 are presented upon display portion 11 which is on the right of the driver 32 and images received from camera 16 which is positioned to the right of the of the driver 32 as displayed upon the display position 9 which is on the left of the driver 32. When mirror assemblies 34, 36 are moved to the extended position, cameras 14, 16 are respectively and substantially prevented from receiving images of objects 28, 30 and/or the portion or region of the ambient environment 27 disposed towards the rear and along the sides 24, 26 of the vehicle.

In this manner, it should be apparent that only two cameras 14, 16 are required to acquire and display images associated with or representing objects 28, 30, 50, 52 located in the front, rear, and/or along the sides 24, 26 of the vehicle 10, thereby obviating the need for four such cameras and substantially simplifying the previously delineated prior system while concomitantly reducing overall system cost.

It should further be appreciated that in alternate and non-limiting embodiments of the invention, each camera 14, 16 may be coupled to a respective gear assembly 56, 66, thereby obviating the need for mirror assemblies 34, 36. Particularly, each gear assembly 56, 66 is coupled to shafts 80, 82 of a respective motor assembly 54, 58 and each motor assembly 54, 58 is selectively coupled, by busses 72, 74, 76 and switch 70 to the vehicular battery 41.

In this manner, when switch 70 is placed in the first position, motor assembly 54, receives electrical power from the vehicular battery 41 and cooperates with gear assembly 56 to cause camera 14 to rotate until the switch 70 is moved to another position. When switch 70 is placed in a second position, motor assembly 58 receives electrical power from the vehicular battery 41 and cooperates with gear assembly 66 to cause the camera 16 to rotate until the switch 70 is moved into another position. In this manner, the use of mirror assemblies 34, 36 are obviated and cameras 14, 16 may selectively be rotated to acquire images of the areas or regions cooperatively surrounding the vehicle 10. Further, in this non-limiting embodiment, display 18 "switches" or "flips" the received images, in the previously delineated manner, when cameras 14, 16 are pointed to the rear of the vehicle 10 (i.e., towards objects 28, 30).

It should be understood that the invention is not limited to the exact construction and method which has been illustrated and described above, but that various changes and modifications may be made without departing from the spirit and the scope of the inventions as is further delineated in the following claims.

What is claimed is:

1. An image display system for use with a vehicle comprising:
    a camera mounted to an outer portion of the vehicle wherein said camera is positioned to selectively capture an image of a first region of an environment outside the vehicle;
    a retractable mirror operatively mounted to an outer portion of the vehicle wherein said mirror is linearly movable between a retracted position out of an image capture view of said camera and an extended position within an image capture view of said camera and said mirror reflects an image from a second region of the environment outside the vehicle that is selectively captured by said camera only in the extended position and the second region image is opposite the first region image; and
    a display device operatively coupled to said camera to display the captured image to a driver of the vehicle.

2. The system of claim 1 wherein said camera includes a night vision image capture means.

3. The system of claim 1 wherein said display device comprises a heads up type display.

4. A vehicular image acquisition and display system for a vehicle, said system comprising:
    a first camera mounted upon a first side of the vehicle which captures and transmits images of a first region of an environment outside the vehicle;
    a second camera mounted upon a second side of the vehicle which captures and transmits images of a first region of an environment outside the vehicle;
    a first retractable mirror operatively mounted to an outer portion of the vehicle wherein said first retractable mirror is linearly movable between a retracted position out of an image capture view of said first camera and an extended position within the image capture view of said first camera and said first retractable mirror transmits an image of a second region of the environment outside the vehicle that is selectively captured by said first camera only in said extended position and the second region image is opposite the first region image;
    a second retractable mirror operatively mounted to an outer portion of the vehicle wherein said second retractable mirror is linearly movable between a retracted position out of an image capture view of said second camera and an extended position within the image capture view of said second camera and said second retractable mirror transmits an image of a second region of the environment outside the vehicle that is selectively captured by said second camera only in said extended position and the second region image is opposite the first region image; and
    a display device operatively in communication with said first and second cameras and which selectively displays captured images from said first and second cameras to a driver of the vehicle.

5. The vehicular image acquisition and display system of claim 4 wherein said first camera or said second camera is directed to capture an image of a first region of the environment which is rearward of the vehicle when said first mirror or said second mirror respectively are retracted.

6. The vehicular image acquisition and display system of claim 4 wherein said first mirror or said second mirror is selectively extendable to transmit an image of a second region of the environment which is forward of the vehicle to said first camera or said second camera respectively when in said extended position.

7. The vehicular image acquisition and display system of claim 4 wherein said display device is a heads up type display.

8. The vehicular image acquisition and display system of claim 7 wherein said first and second cameras each include a night vision image capture means.

9. A method of acquiring and displaying images for a vehicle, said method comprising the steps of:
    positioning a camera upon an outer portion of the vehicle so that the camera captures an image of a first region of an environment outside the vehicle;
    positioning a retractable mirror upon an outer portion of the vehicle, wherein the mirror traverses linearly between a retracted position out of view of the camera and an extended position in the view of the camera;
    using the camera to capture images from a first region of the environment outside the vehicle with the mirror retracted;
    extending the mirror in front of the camera to reflect images from a second region of the environment outside the vehicle for capture by the camera; and
    transmitting the captured image to a display device mounted inside the vehicle and displaying the captured image on the display device to a driver of the vehicle.

10. The method of claim 9 wherein said step of positioning a camera comprises the step of rotatably mounting the camera upon the vehicle.

11. The method of claim 9 wherein said display device is a heads up type display.

12. The method of claim 9 wherein the first region is an environment rearward of the camera position, and the second region is an environment forward of the camera position.

13. The system of claim 1 further comprising a switching means for selectively extending and retracting said retractable mirror.

14. The system of claim 4 further comprising a switching means for selectively extending and retracting either one of said first retractable mirror or said second retractable mirror.

* * * * *